US009002623B2

(12) United States Patent
Cowgill

(10) Patent No.: US 9,002,623 B2
(45) Date of Patent: Apr. 7, 2015

(54) FULLY FLEXIBLE EXHAUST VALVE ACTUATOR CONTROL SYSTEMS AND METHODS

(75) Inventor: Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 13/565,243

(22) Filed: Aug. 2, 2012

(65) Prior Publication Data
US 2014/0039776 A1 Feb. 6, 2014

(51) Int. Cl.
| F02D 13/00 | (2006.01) |
| F01L 1/34 | (2006.01) |
| F02D 41/00 | (2006.01) |
| F02B 1/12 | (2006.01) |
| F02D 13/02 | (2006.01) |
| F02D 41/30 | (2006.01) |
| F02M 25/07 | (2006.01) |

(52) U.S. Cl.
CPC ............... F02D 41/307 (2013.01); *F02B 1/12* (2013.01); *F02D 13/0207* (2013.01); F02D 13/0249 (2013.01); F02D 13/0253 (2013.01); F02D 13/0265 (2013.01); F02D 41/006 (2013.01); *F02D 41/3035* (2013.01); *F02D 2041/001* (2013.01); *F02M 25/0707* (2013.01); *F02M 25/0752* (2013.01); *Y02T 10/128* (2013.01); *Y02T 10/18* (2013.01); *Y02T 10/47* (2013.01)

(58) Field of Classification Search
CPC ..................... F02D 41/3023; F02D 41/3035
USPC ................. 123/90.15–90.18, 294, 295, 305; 701/102, 104, 105
See application file for complete search history.

(56) References Cited

U.S. PATENT DOCUMENTS

| 8,195,375 | B2 * | 6/2012 | Chen et al. ............ 701/103 |
| 8,602,002 | B2 * | 12/2013 | Brennan .............. 123/435 |
| 2008/0066713 | A1 * | 3/2008 | Megli et al. .......... 123/295 |
| 2008/0173265 | A1 * | 7/2008 | Sandquist et al. ..... 123/90.15 |
| 2009/0229565 | A1 * | 9/2009 | Kang et al. .......... 123/295 |
| 2010/0242902 | A1 * | 9/2010 | Kang et al. .......... 123/305 |
| 2011/0168130 | A1 * | 7/2011 | Kang et al. .......... 123/295 |

* cited by examiner

*Primary Examiner* — Erick Solis

(57) ABSTRACT

A system for a vehicle includes a mode control module and a valve control module. The mode control module selectively sets a desired ignition mode for an engine to one of a spark ignition (SI) mode and a homogenous charge compression ignition (HCCI) mode. Using a fully flexible valve actuator, the valve actuator module selectively adjusts closing timing of an exhaust valve in response to: the desired ignition mode transitioning from the HCCI mode to the SI mode; and the desired ignition mode transitioning from the SI mode to the HCCI mode.

20 Claims, 3 Drawing Sheets

FULLY FLEXIBLE EXHAUST VALVE ACTUATOR CONTROL SYSTEMS AND METHODS

GOVERNMENT INTEREST

Portions or all of this invention may have been produced pursuant to U.S. Government Contract No. DE-FC26-05NT42415. The U.S. Government may therefore have certain rights in this invention.

FIELD

The present disclosure relates to internal combustion engines and more particularly to fully flexible valve control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

A system for a vehicle includes a mode control module and a valve control module. The mode control module selectively sets a desired ignition mode for an engine to one of a spark ignition (SI) mode and a homogenous charge compression ignition (HCCI) mode. Using a fully flexible valve actuator, the valve actuator module selectively adjusts closing timing of an exhaust valve in response to: the desired ignition mode transitioning from the HCCI mode to the SI mode; and the desired ignition mode transitioning from the SI mode to the HCCI mode.

A method for a vehicle includes: selectively setting a desired ignition mode for an engine to one of a spark ignition (SI) mode and a homogenous charge compression ignition (HCCI) mode. The method further includes, using a fully flexible valve actuator, selectively adjusting closing timing of an exhaust valve in response to: the desired ignition mode transitioning from the HCCI mode to the SI mode; and the desired ignition mode transitioning from the SI mode to the HCCI mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
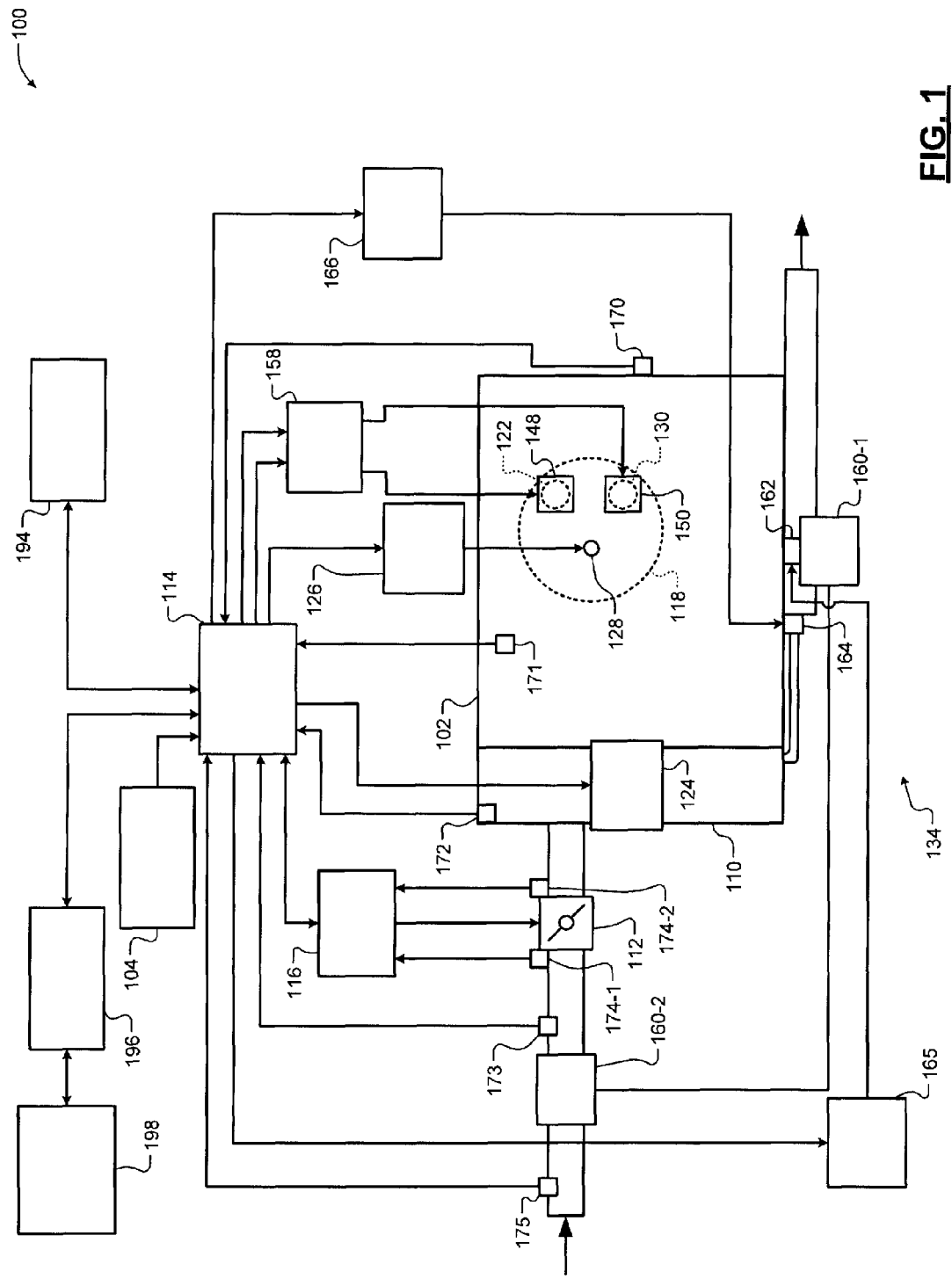
FIG. 1 is a functional block diagram of an example engine system according to the present disclosure.

An engine combusts a mixture of air and fuel within cylinders to generate drive torque. A throttle valve regulates airflow into the engine. Fuel is injected by fuel injectors. Intake and exhaust valves of a cylinder are controlled to regulate airflow into the cylinder and exhaust flow out of the cylinder.

Combustion of the air/fuel mixture within the engine may be initiated in one or more ways. For example, during operation in a spark ignition (SI) mode, spark generated by spark plugs may ignite the air/fuel mixture. During operation of the engine in a homogenous charge compression ignition (HCCI) mode, heat and pressure from compression may ignite the air/fuel mixture. Spark plugs may be disabled or remain enabled during operation in the HCCI mode.

Traditionally, opening of the intake and exhaust valves of the cylinder is controlled by one or more camshafts. Using a fully flexible valve actuation (FFVA) system, however, each valve of the engine can be controlled independently of each other valve. For example, an engine control module (ECM) can control opening of an intake valve of a cylinder separately from an exhaust valve of the cylinder. The ECM can also control opening of the intake valve of the cylinder separately from intake valves of other cylinders.

During operation in HCCI mode, the ECM regulates exhaust valve closing timing of each cylinder based on a first predetermined timing. The ECM regulates the exhaust valve closing timing of each cylinder based on a second predetermined timing during operation in SI mode. The second predetermined timing may be later than (i.e., retarded from) the first predetermined timing. Generally, where the exhaust valve closing timing is before top dead center (TDC) following the exhaust stroke, retarding the exhaust valve closing timing decreases the amount of exhaust that will remain trapped within a cylinder and vice versa.

To transition from HCCI mode to SI mode, the ECM may switch from regulating exhaust valve closing timing based on the first predetermined timing to regulating exhaust valve closing timing based on the second predetermined timing over one engine cycle. The ECM may switch from regulating exhaust valve closing timing based on the second predetermined timing to regulating exhaust valve closing timing based on the first predetermined timing over one engine cycle for a transition from SI mode to HCCI mode. Such a step change in exhaust valve closing timing, however, may cause a change in the amount of residual exhaust gas trapped within the cylinders and a change in the amount of air that can be drawn into the cylinders among other affected parameters. Discrete changes in the amount of residual exhaust gas and/or air per cylinder (APC) may cause changes in engine torque output and/or one or more other engine operating parameters.

The ECM therefore adjusts exhaust valve closing timing incrementally during transitions from HCCI mode to SI mode and vice versa. When transitioning to SI mode, the ECM incrementally retards exhaust valve closing timing to reduce residual exhaust gas. When transitioning to HCCI mode, the ECM incrementally advances exhaust valve closing timing to increase residual exhaust gas. Adjusting exhaust valve closing timing incrementally may minimize the magnitude of changes in engine torque output during transitions from HCCI mode to SI mode and vice versa.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 may include more than one cylinder, for illustration purposes a single representative cylinder 118 is shown. The engine 102 may operate using a four-stroke cycle. The four strokes, described below, may be named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to complete all four of the strokes.

During the intake stroke, air from the intake manifold 110 is drawn into the cylinder 118 through an intake valve 122. The ECM 114 controls a fuel actuator module 124, which regulates fuel injection by fuel injectors (not shown) to achieve a desired air/fuel ratio. The fuel injectors inject fuel directly into the cylinders. Fuel is provided to the fuel injectors by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel for direct injection into the cylinders.

The injected fuel mixes with air and creates an air/fuel mixture in the cylinder 118. During the compression stroke, a piston (not shown) within the cylinder 118 compresses the contents of the cylinder 118. Based upon a signal from the ECM 114, a spark actuator module 126 may energize a spark plug 128 in the cylinder 118. Spark generated by the spark plug 128 ignites the air/fuel mixture during spark ignition (SI) operation. The timing of the spark may be specified relative to the time when the piston is at its topmost position, referred to as top dead center (TDC). During homogenous charge compression ignition (HCCI) operation, heat and pressure generated by compression causes ignition of the air/fuel mixture. The ECM 114 may control whether the engine 102 operates using SI or HCCI. The ECM 114 may determine whether to operate the engine 102 using HCCI or SI, for example, based on engine speed, engine load, and/or one or more other suitable parameters.

Generating spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 130. The byproducts of combustion are exhausted from the vehicle via an exhaust system 134.

An intake valve actuator 148 controls actuation of the intake valve 122. An exhaust valve actuator 150 controls actuation of the exhaust valve 130. A valve actuator module 158 controls the intake and exhaust valve actuators 148 and 150 based on signals from the ECM 114.

The intake and exhaust valve actuators 148 and 150 control opening and closing of the intake and exhaust valves 122 and 130, respectively. The intake and exhaust valve actuators 148 and 150 are fully flexible valve actuators. The intake and exhaust valve actuators 148 and 150 may include, for example, electro-hydraulic actuators, electro-mechanical actuators, or another suitable type of fully flexible valve actuator. Fully flexible valve actuators may be camshaft based valve actuators or camless valve actuators. One fully flexible valve actuator may be provided for each intake valve of the engine 102, and one fully flexible valve actuator may be provided for each exhaust valve of the engine 102. In various implementations, one fully flexible valve actuator may be provided for a set of intake valves of each cylinder, and one fully flexible valve actuator may be provided for a set of exhaust valves of each cylinder. In various implementations, one fully flexible valve actuator may be provided for all of the intake valves of the engine 102, and one fully flexible valve actuator may be provided for all exhaust valves of the engine 102.

Fully flexible intake and exhaust valve actuators enable actuation of each intake valve and exhaust valve of the engine 102 to be controlled independently of each other valve. The intake and exhaust valve actuators provide what may be referred to as fully flexible valve actuation (FFVA). Using FFVA, the flow of gasses into and out of each cylinder can be regulated (via control of intake and exhaust valve opening and closing) to control the flow into and out of the cylinders and, therefore, the combustion conditions within each cylinder. For example, exhaust valve closing timing of a cylinder may be adjusted (advanced or retarded) to control the amount of residual exhaust trapped within each cylinder.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

Position of the crankshaft may be measured using a crankshaft position sensor 170. Engine speed, engine acceleration, and/or one or more other parameters may be determined based on the crankshaft position. A temperature of the engine coolant may be measured using an engine coolant temperature (ECT) sensor 171. The ECT sensor 171 may be located within the engine 102 or at other locations where the coolant is circulated, such as a radiator (not shown).

A pressure within the intake manifold 110 may be measured using a manifold absolute pressure (MAP) sensor 172. In various implementations, engine vacuum, which is the difference between ambient air pressure and the pressure within the intake manifold 110, may be measured. A mass flowrate of air flowing into the intake manifold 110 may be measured using a mass air flowrate (MAF) sensor 173. In various implementations, the MAF sensor 173 may be located in a housing that also includes the throttle valve 112.

Position of the throttle valve 112 may be measured using one or more throttle position sensors (TPS) 174. For example, first and second throttle position sensors 174-1 and 174-2 monitor position of the throttle valve 112 and generate first and second throttle positions (TPS1 and TPS2), respectively, based on the throttle position. A temperature of air being drawn into the engine 102 may be measured using an intake air temperature (IAT) sensor 175. The ECM 114 may use signals from the sensors and/or one or more other sensors to make control decisions for the engine system 100.

A transmission control module 194 may control operation of a transmission (not shown). The ECM 114 may communicate with the transmission control module 194 for various reasons, such as to share parameters and to coordinate engine operation with operation of the transmission. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator and may be used to produce electrical energy for use by vehicle electrical systems and/or for storage in a battery. The electric motor 198 may also function as a motor and may be used, for example, to supplement or replace engine torque output. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the fuel actuator module 124, the valve actuator module 158, the boost actuator module 165, and the EGR actuator module 166. For these actuators, the actuator values may correspond to fueling rate, intake and exhaust valve timing, boost pressure, and EGR valve opening area, respectively. The ECM 114 may control actuator values in order to cause the engine 102 to generate a desired engine output torque.

Figure 2:
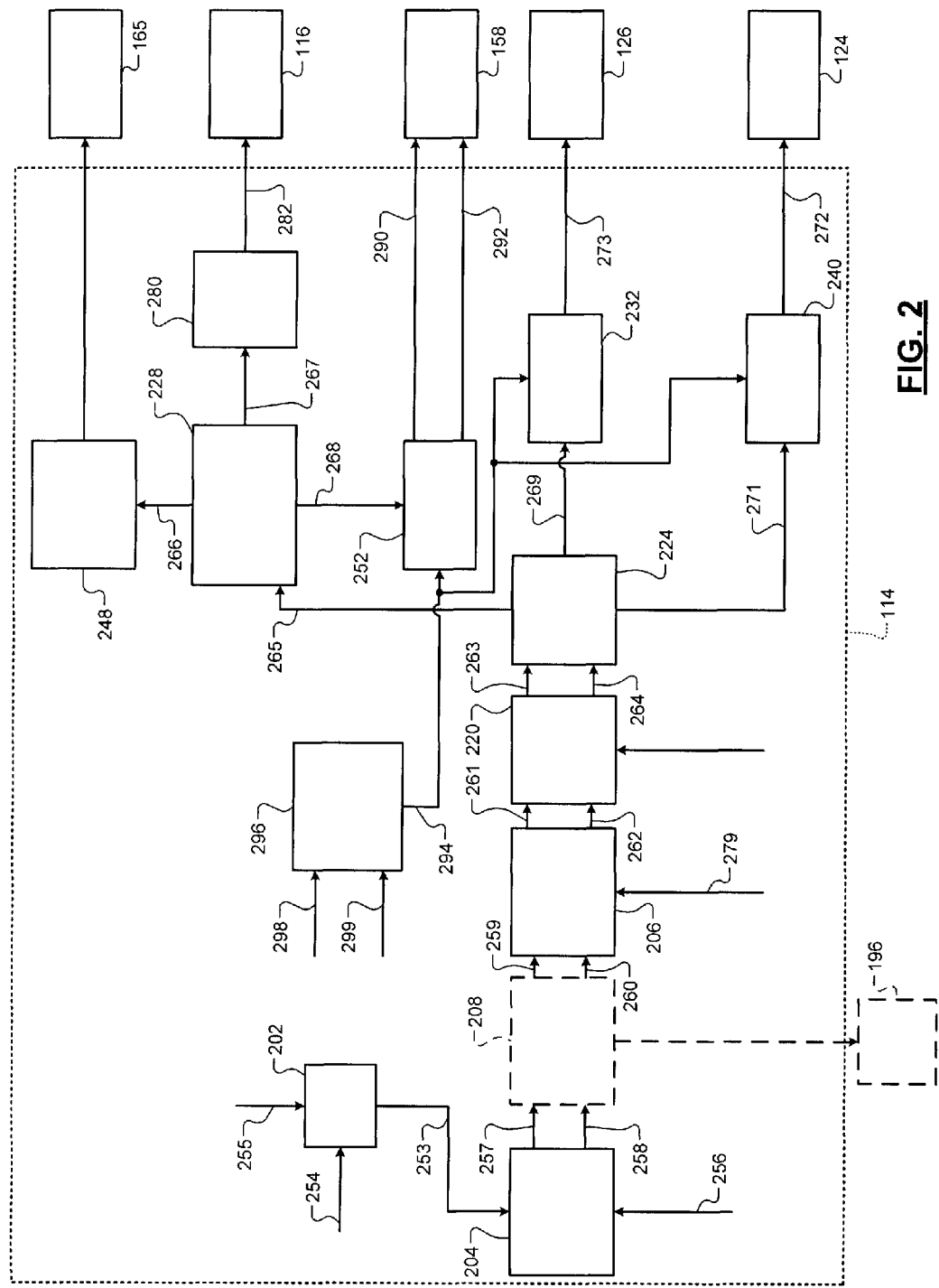
FIG. 2 is a functional block diagram of an example engine control system according to the present disclosure.

Referring now to FIG. 2, a functional block diagram of an example engine control system including a portion of the ECM 114 is presented. An example implementation of the ECM 114 includes a driver torque module 202, an axle torque arbitration module 204, and a propulsion torque arbitration module 206. The ECM 114 may include a hybrid optimization module 208. The example implementation of the ECM 114 also includes a reserves/loads module 220, an actuation module 224, an air control module 228, a spark control module 232, and a fuel control module 240. The example implementation of the ECM 114 also includes a boost scheduling module 248 and a valve control module 252.

The driver torque module 202 may determine a driver torque request 253 (e.g., newton meters, Nm) based on driver input 254 from the driver input module 104. The driver input 254 may be based on, for example, a position of an accelerator pedal and a position of a brake pedal. The driver input 254 may also be based on inputs from a cruise control system, which may be an adaptive cruise control system. Adaptive cruise control systems vary vehicle speed to maintain a predetermined following distance.

The driver torque module 202 may determine the driver torque request 253 further based on a vehicle speed 255. For example only, the vehicle speed 255 may be generated based on one or more measured wheel speeds, a transmission output shaft speed, and/or one or more other suitable parameters.

An axle torque arbitration module 204 arbitrates between the driver torque request 253 and other axle torque requests 256. Axle torque (torque to the wheels) may be produced by various sources including an engine and/or an electric motor. The axle torque arbitration module 204 outputs a predicted torque request 257 (e.g., in Nm) and an immediate torque request 258 (e.g., in Nm) based on the results of the arbitration between the driver and axle torque requests 253 and 256. As described below, the predicted and immediate torque requests 257 and 258 from the axle torque arbitration module 204 may selectively be adjusted by other modules before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 253. The immediate torque request 258 may be less than the predicted torque request 257, such as when the driver torque request 253 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 may then output modified predicted and immediate torque requests 259 and 260 (e.g., in Nm), respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279 and the predicted and immediate propulsion torque requests resulting from the conversion of the received predicted and immediate torque requests into the propulsion torque domain. The propulsion torque arbitration module 206 generates an arbitrated predicted torque request 261 (e.g., in Nm) and an arbitrated immediate torque request 262 (e.g., in Nm) as a result of the arbitration. The arbitrated torque requests 261 and 262 may be generated by selecting a winning request from among received torque requests. Alternatively or additionally, the arbitrated torque requests 261 and 262 may be generated by modifying one of the received torque requests based on another one or more of the received torque requests.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 (e.g., in Nm) to the actuation module 224.

In general terms, the difference between the adjusted immediate torque request 264 and the (generally higher) adjusted predicted torque request 263 can be referred to as a torque reserve (e.g., in Nm). The torque reserve may represent the amount of additional torque (above the adjusted immediate torque request 264) that the engine system 100 can begin to produce with minimal delay. The torque reserve can absorb sudden increases in required torque. For example only, sudden loads imposed by an air conditioner or a power steering pump may be counteracted by using all or a part of the torque reserve by increasing the adjusted immediate torque request 264.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the adjusted immediate torque request 264 while maintaining the values of the slow actuators.

The reserves/loads module 220 may also create or increase a torque reserve in anticipation of a future load, such as power steering pump operation or engagement of an air conditioning (A/C) compressor clutch. The torque reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. In various implementations, the actuation module 224 may generate an air torque request 265 (e.g., in Nm) based on the adjusted predicted torque request 263. The air torque request 265 may be set equal to the adjusted predicted torque request 263, setting air flow so that the adjusted predicted torque request 263 can be achieved by changes to other actuators, such as the spark actuator module 126 and/or the fuel actuator module 124.

The air control module 228 determines desired actuator values based on the air torque request 265. For example only, the air control module 228 may determine a desired manifold absolute pressure (MAP) 266, a desired throttle position 267, and/or a desired mass of air per cylinder (APC) 268 based on the air torque request 265.

The actuation module 224 may also generate a spark torque request 269 and a fuel torque request 271. The actuation module 224 may generate the spark torque request 269 and the fuel torque request 271 based on the adjusted immediate torque request 264. The spark torque request 269 may be used by the spark control module 232 to determine how much, if any, to retard the spark timing from a calibrated spark timing. The calibrated spark timing may vary based on various engine operating conditions.

For example only, a torque relationship may be inverted to solve for a desired spark timing 273. For a given torque request ($T_{Des}$), the desired spark timing ($S_{Des}$) 273 may be determined based on:

$$S_{Des} = T^{-1}(T_{Des}, APC, I, E, AF, OT, \#), \tag{1}$$

where APC is air per cylinder, I is intake valve timing, E is exhaust valve timing, AF is air/fuel ratio, OT is oil temperature, and # is a number of activated cylinders. Additional variables may also be accounted for, such as the degree of opening of the EGR valve 164. This relationship may be embodied as an equation and/or as a lookup table.

When the spark timing is set to the calibrated spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The calibrated spark timing may differ slightly from MBT spark timing because of, for example, fuel quality (such as when lower octane fuel is used) and environmental factors. The engine output torque at the calibrated spark timing may therefore be less than MBT.

The fuel control module 240 may control the amount of fuel provided to the cylinders based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. For example, the fuel control module 240 may determine a fuel mass that will yield stoichiometric combustion with the current APC. The fuel control module 240 may instruct the fuel actuator module 124 via a fueling rate 272 to inject this fuel mass into each activated cylinder. The fuel control module 240 also controls timing of fuel injection and number of pulses of fuel used for each fuel injection.

The air control module 228 may determine the desired throttle position 267 based on the air torque request 265. The air control module 228 may output the desired throttle position 267 to a throttle control module 280. The throttle control module 280 may generate a desired pulse width modulation (PWM) signal 282 using closed-loop control based on the desired throttle position 267. The throttle actuator module 116 actuates the throttle valve 112 based on the desired PWM signal 282. While PWM is shown and discussed, the throttle control module 280 may control the throttle actuator module 116 using another suitable type of signal.

The air control module 228 may output the desired MAP 266 to the boost scheduling module 248. The boost scheduling module 248 uses the desired MAP 266 to control the boost actuator module 165. The boost actuator module 165 then controls one or more turbochargers (e.g., the turbocharger including the turbine 160-1 and the compressor 160-2) and/or superchargers.

The air control module 228 determines the desired APC 268 based on the air torque request 265. For example only, the torque relationship can also be inverted to solve for the desired APC 268. For a given torque request ($T_{Des}$), the desired APC 268 ($APC_{Des}$) may be determined based on:

$$APC_{Des} = T^{-1}(T_{Des}, S, I, E, AF, OT, \#), \qquad (2)$$

where S is spark timing, I is intake valve timing, E is exhaust valve timing, AF is air/fuel ratio, OT is oil temperature, and # is the number of activated cylinders. Again, additional variables may also be accounted for, such as the degree of opening of the EGR valve 164. This relationship may be embodied as an equation and/or as a lookup table. The spark timing (S), the intake and exhaust valve timings (I) and (E), and the air/fuel ratio (AF) may be the actual values as reported by the spark control module 232, the valve control module 252, and the fuel control module 240.

The valve control module 252 determines a desired intake valve timing 290 for a next cylinder in a predetermined firing order of the cylinders as a function of the desired APC 268. The function may be embodied as an equation and/or as a lookup table. Additionally or alternatively, the valve control module 252 may determine the desired intake valve timing 290 for the next cylinder in the predetermined firing order of the cylinders a function of a desired amount of trapped residual exhaust gas.

The valve control module 252 also determines a desired exhaust valve timing 292. The valve control module 252 may determine the desired exhaust valve timing 292 as a function of the desired APC 268. Additionally or alternatively, the valve control module 252 may determine the desired exhaust valve timing 292 for the next cylinder in the predetermined firing order of the cylinders a function of the desired amount of trapped residual exhaust gas. In various implementations, the valve control module 252 may determine the desired exhaust valve timing 292 and determine the desired intake valve timing 290 based on the desired exhaust valve timing 292 or vice versa.

A valve timing may include an open timing (e.g., in crank angle degrees, CAD) of a valve (e.g., an intake valve or an exhaust valve) and a closing timing of the valve (e.g., in CAD). The period between the opening and closing timings of a valve may be referred to as valve duration. In other words, valve duration may refer to the period that the valve is open during a combustion cycle.

The fuel control module 240, the spark control module 232, the throttle control module 280, and the valve control module 252 may make control decisions based on a desired ignition mode 294. A mode control module 296 may set the desired ignition mode 294 to one of the SI mode and the HCCI mode at a given time. While the mode control module 296 will be discussed as setting the desired ignition mode 294 to one of two discrete modes (the SI mode or the HCCI mode), the mode control module 196 may also set the desired ignition mode 294 to one or more mixed SI/HCCI modes where combustion includes both SI and HCCI combustion components. For example, in mixed SI/HCCI combustion, combustion may start with SI flame propagation and end with HCCI spontaneous combustion of the remaining charge. The mode control module 196 may set the desired ignition mode 294 to a mixed mode for achieving mixed SI/HCCI combustion with desired characteristics for the SI combustion component and the HCCI combustion component. Accordingly, as used herein, transitioning from SI mode to the HCCI mode may refer to both transitions in the desired ignition mode 294 from the SI mode to the HCCI mode and to transitions to operating with more HCCI combustion and less SI combustion. Transitioning from the HCCI mode to the SI mode may accordingly refer to both transitions in the desired ignition mode 294 from the HCCI mode to the SI mode and to transitions to operating with more SI combustion and less HCCI combustion.

Spark may be supplied for combustion when the desired ignition mode 294 is set to the SI mode. Spark may be disabled or may remain enabled when the desired ignition mode 294 is set to the HCCI mode. In various implementations, spark may be provided at some or all times while the desired ignition mode 294 is set to the HCCI mode.

The mode control module 296 may set the desired ignition mode 294 to one of the SI mode and the HCCI mode at a given time based on an engine load 298, an engine speed 299, and/or one or more other suitable parameters. For example only, the mode control module 296 may set the desired ignition mode 294 to the SI mode when the engine load 298 is greater than a first predetermined engine load. The mode control module 296 may set the desired ignition mode 294 to the HCCI mode when the engine load 298 is less than a second predetermined engine load. The first and second predetermined engine loads may be the same or may be different. For example, the first predetermined engine load may be equal to the second predetermined engine load when transitioning from the HCCI mode to the SI mode, and the first predetermined engine load may be greater than the second engine load when transitioning from the SI mode to the HCCI mode. The engine load 298 may be determined based on an APC, such as the current APC, and/or one or more other suitable parameters. The engine speed 299 may be generated, for example, based on measurements from the crankshaft position sensor 170.

When the desired ignition mode 294 is set to the HCCI mode, the valve control module 252 regulates exhaust valve closing timing (via the desired exhaust valve timing 292) of each of the cylinders based on a first predetermined timing. For example, the valve control module 252 may set the exhaust valve closing timing of each of the cylinders to the first predetermined timing when the desired ignition mode 294 is set to the HCCI mode. The valve control module 252 may selectively adjust (i.e., advance or retard) the exhaust valve closing timing from the first predetermined timing based on one or more engine operating parameters while the desired ignition mode 294 is set to the HCCI mode.

When the desired ignition mode 294 is set to the SI mode, the valve control module 252 regulates exhaust valve closing timing of each of the cylinders based on a second predetermined timing. For example, the valve control module 252 may set the exhaust valve closing timing of each of the cylinders to the second predetermined timing when the desired ignition mode 294 is set to the SI mode. The valve control module 252 may selectively adjust the exhaust valve closing timing from the second predetermined timing based on one or more engine operating parameters while the desired ignition mode 294 is set to the SI mode. The second predetermined timing is later than (i.e., retarded from) the first predetermined timing.

When the desired ignition mode 294 transitions from the HCCI mode to the SI mode, the valve control module 252 may, from one engine cycle (e.g., the current engine cycle) to the next, switch to regulating exhaust valve closing timing of each of the cylinders based on the second predetermined timing. More specifically, the valve control module 252 may control exhaust valve closing timing based on the first predetermining timing (for the HCCI mode) during one engine cycle and control exhaust valve closing timing based on the second predetermined timing (for the SI mode) during the next engine cycle.

The opposite may be true when the desired ignition mode 294 transitions from the SI mode to the HCCI mode. When the desired ignition mode 294 transitions from the SI mode to the HCCI mode, the valve control module 252 may, from one engine cycle to the next, switch to regulating exhaust valve closing timing of each of the cylinders based on the first predetermined timing.

Such a step change in exhaust valve closing timing between consecutive engine cycles, however, affects the amount of residual exhaust gas trapped within each cylinder. The amount of residual exhaust gas within the cylinders affects the amount of air that can be drawn into the cylinders. Changes in the amount of residual exhaust gas and/or the APC may cause changes in engine torque output.

In response to a transition in the desired ignition mode 294, the valve control module 252 adjusts exhaust valve closing timing incrementally. The valve control module 252 may adjust exhaust valve closing timing, for example, by a predetermined amount (e.g., angle in degrees) per firing event or by the predetermined amount per engine cycle. The predetermined amount may be a fixed value or may be a variable value. Adjusting exhaust valve closing timing incrementally may minimize changes in engine torque output during transitions from HCCI operation to SI operation and vice versa.

When adjusting exhaust valve closing timing per firing event, the exhaust valve closing timing will be adjusted cylinder by cylinder in the firing order of the cylinders. In other words, an exhaust valve closing timing will be used for one cylinder, and the exhaust valve closing timing will be adjusted by the predetermined amount and used for the next cylinder in the firing order of the cylinders. The exhaust valve closing timing will be adjusted by the predetermined amount for a second time and used for the next cylinder in the firing order and so on.

When adjusting exhaust valve closing timing per engine cycle, the exhaust valve closing timing used for all of the cylinders will be adjusted once per engine cycle. In other words, an exhaust valve closing timing will be used for all of the cylinders during one engine cycle, and the exhaust valve closing timing will be adjusted by the predetermined amount and used for all of the cylinders during the next engine cycle. The exhaust valve closing timing will be adjusted by the predetermined amount for a second time and used for all of the cylinders during the next engine cycle and so on.

In response to a transition in the desired ignition mode 294 from the HCCI mode to the SI mode, the valve control module 252 incrementally retards exhaust valve closing timing from the first predetermining timing toward or to the second predetermined timing using a first predetermined amount (e.g., angle in degrees). The valve control module 252 may retard the exhaust valve closing timing by the first predetermined amount, for example, per firing event or per engine cycle.

In response to a transition in the desired ignition mode 294 from the SI mode to the HCCI mode, the valve control module 252 incrementally advances exhaust valve closing timing from the first predetermining timing toward and/or to the second predetermined timing using a second predetermined amount (e.g., angle in degrees). The valve control module 252 may advance the exhaust valve closing timing by the second predetermined amount, for example, per firing event or per engine cycle. The first and second predetermined amounts may be the same or may be different.

Figure 3A:
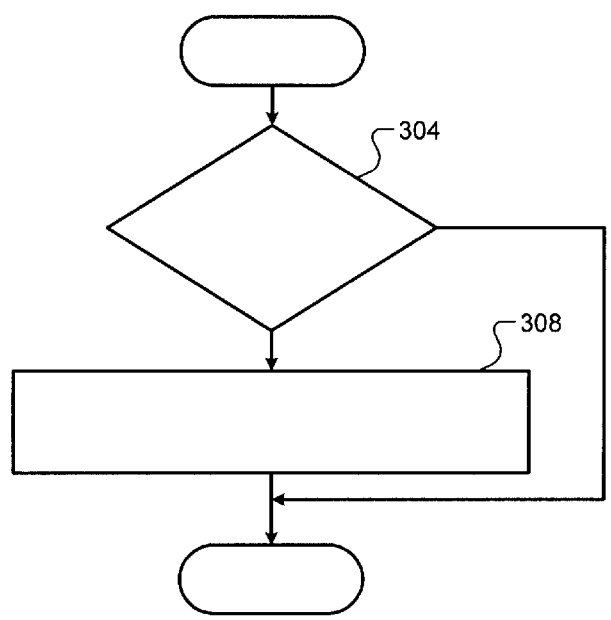
FIG. 3A is a flowchart depicting an example method of controlling exhaust valve closing timing for a transition from HCCI mode to SI mode.

Referring now to FIG. 3A, a flowchart depicting an example method of controlling exhaust valve closing timing for a transition from HCCI mode to SI mode is presented. Control may begin at 304 when the desired ignition mode 294 is set to the HCCI mode. At 304, control may determine whether the desired ignition mode 294 transitioned from the HCCI mode to the SI mode. If false, control may end. If true, at 308 control incrementally retards exhaust valve closing timing toward or to the second predetermined timing by the first predetermined amount. Control may retard exhaust valve closing timing by the first predetermined amount, for example, per firing event or per engine cycle. Retarding exhaust valve closing timing reduces residual exhaust gas that will be trapped within a cylinder, thereby allowing a greater amount of air to be drawn into the cylinder during the next engine cycle.

Figure 3B:
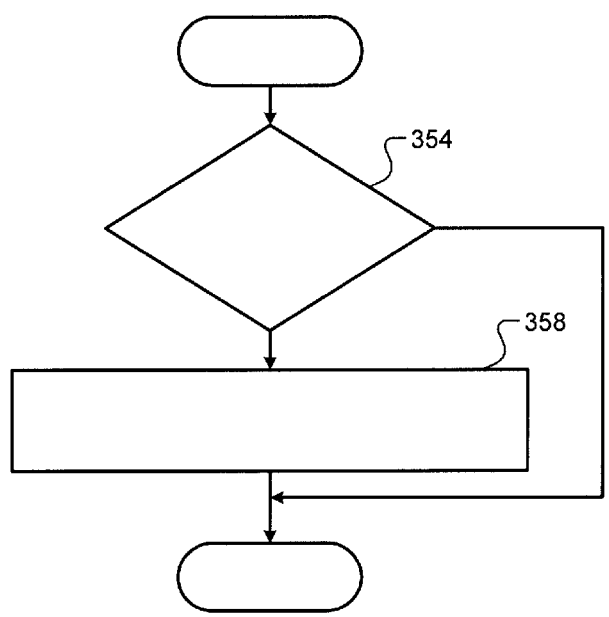
FIG. 3B is a flowchart depicting an example method of controlling exhaust valve closing timing for a transition from SI mode to HCCI mode.

Referring now to FIG. 3B, a flowchart depicting an example method of controlling exhaust valve closing timing for a transition from SI mode to the HCCI mode is presented. Control may begin at 354 when the desired ignition mode 294 is set to the SI mode. At 354, control may determine whether the desired ignition mode 294 transitioned from the SI mode to the HCCI mode. If false, control may end. If true, at 358 control incrementally advances exhaust valve closing timing toward or to the first predetermined timing by the second predetermined amount. Control may advance exhaust valve closing timing by the second predetermined amount, for example, per firing event or per engine cycle. Advancing exhaust valve closing timing increases residual exhaust gas that will be trapped within a cylinder, thereby decreasing the amount of air that will be drawn into the cylinder during the next engine cycle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a mode control module that selectively sets a desired ignition mode for an engine to one of a spark ignition (SI) mode and a homogenous charge compression ignition (HCCI) mode; and
a valve control module that, using a fully flexible valve actuator, incrementally adjusts closing timing of an exhaust valve at least twice in response to:
the desired ignition mode transitioning from the HCCI mode to the SI mode; and
the desired ignition mode transitioning from the SI mode to the HCCI mode.

2. The system of claim 1 wherein, in response to the desired ignition mode transitioning from the HCCI mode to the SI mode, the valve control module incrementally retards the closing timing of the exhaust valve at least twice using the fully flexible valve actuator, and
in response to the desired ignition mode transitioning from the SI mode to the HCCI mode, the valve control module incrementally advances the closing timing of the exhaust valve at least twice using the fully flexible valve actuator.

3. The system of claim 2 wherein the valve control module incrementally advances the closing timing of the exhaust valve by a first predetermined angle at least twice in response to the desired ignition mode transitioning from the SI mode to the HCCI mode.

4. The system of claim 2 wherein the valve control module incrementally retards the closing timing of the exhaust valve by a second predetermined angle at least twice in response to the desired ignition mode transitioning from the HCCI mode to the SI mode.

5. The system of claim 2 wherein the valve control module incrementally advances the closing timing of the exhaust valve by a first predetermined angle at least twice in response to the desired ignition mode transitioning from the SI mode to the HCCI mode, and
wherein the valve control module incrementally retards the closing timing of the exhaust valve by a second predetermined angle at least twice in response to the desired ignition mode transitioning from the HCCI mode to the SI mode.

6. The system of claim 5 wherein the first predetermined angle is equal to the second predetermined angle.

7. The system of claim 5 wherein the first predetermined angle is one of greater than and less than the second predetermined angle.

8. The system of claim 1 wherein the mode control module sets the desired ignition mode to one of the SI mode and the HCCI mode based on an engine load.

9. The system of claim 8 wherein the mode control module transitions the desired ignition mode from the HCCI mode to the SI mode in response to a determination that the engine load is greater than a first predetermined load, and
wherein the mode control module transitions the desired ignition mode from the SI mode to the HCCI mode in response to a determination that the engine load is less than a second predetermined load.

10. The system of claim 8 wherein the mode control module sets the desired ignition mode to one of the SI mode and the HCCI mode further based on an engine speed.

11. A method comprising:
selectively setting a desired ignition mode for an engine to one of a spark ignition (SI) mode and a homogenous charge compression ignition (HCCI) mode; and
using a fully flexible valve actuator, incrementally adjusting closing timing of an exhaust valve at least twice in response to:
the desired ignition mode transitioning from the HCCI mode to the SI mode; and
the desired ignition mode transitioning from the SI mode to the HCCI mode.

12. The method of claim 11 further comprising:
in response to the desired ignition mode transitioning from the HCCI mode to the SI mode, incrementally retarding the closing timing of the exhaust valve at least twice using the fully flexible valve actuator; and
in response to the desired ignition mode transitioning from the SI mode to the HCCI mode, incrementally advancing the closing timing of the exhaust valve at least twice using the fully flexible valve actuator.

13. The method of claim 12 further comprising incrementally advancing the closing timing of the exhaust valve by a first predetermined angle at least twice in response to the desired ignition mode transitioning from the SI mode to the HCCI mode.

14. The method of claim 12 further comprising incrementally retarding the closing timing of the exhaust valve by a second predetermined angle at least twice in response to the desired ignition mode transitioning from the HCCI mode to the SI mode.

15. The method of claim 12 further comprising:
  incrementally advancing the closing timing of the exhaust valve by a first predetermined angle at least twice in response to the desired ignition mode transitioning from the SI mode to the HCCI mode; and
  incrementally retarding the closing timing of the exhaust valve by a second predetermined angle at least twice in response to the desired ignition mode transitioning from the HCCI mode to the SI mode.

16. The method of claim 15 wherein the first predetermined angle is equal to the second predetermined angle.

17. The method of claim 15 wherein the first predetermined angle is one of greater than and less than the second predetermined angle.

18. The method of claim 11 further comprising setting the desired ignition mode to one of the SI mode and the HCCI mode based on an engine load.

19. The method of claim 18 further comprising:
  transitioning the desired ignition mode from the HCCI mode to the SI mode in response to a determination that the engine load is greater than a first predetermined load; and
  transitioning the desired ignition mode from the SI mode to the HCCI mode in response to a determination that the engine load is less than a second predetermined load.

20. The method of claim 18 further comprising setting the desired ignition mode to one of the SI mode and the HCCI mode further based on an engine speed.

\* \* \* \* \*